United States Patent
Leistner et al.

(10) Patent No.: US 12,281,724 B2
(45) Date of Patent: Apr. 22, 2025

(54) METHOD FOR MANUFACTURING A MICROMECHANICAL DEVICE AND MICROMECHANICAL VALVE

(71) Applicant: Fraunhofer-Gesellschaft zur Foerderung der angewandten Forschung e.V., Munich (DE)

(72) Inventors: Henry Leistner, Munich (DE); Martin Richter, Munich (DE); Martin Wackerle, Munich (DE); Juergen Kruckow, Munich (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 695 days.

(21) Appl. No.: 17/536,975

(22) Filed: Nov. 29, 2021

(65) Prior Publication Data
US 2022/0082181 A1    Mar. 17, 2022

Related U.S. Application Data

(63) Continuation of application No. PCT/EP2020/065067, filed on May 29, 2020.

(30) Foreign Application Priority Data

May 31, 2019  (DE) .......................... 102019208023.5

(51) Int. Cl.
    *F16K 99/00*    (2006.01)
    *F04B 43/04*    (2006.01)
(52) U.S. Cl.
    CPC ...... *F16K 99/0015* (2013.01); *F16K 99/0057* (2013.01); *F04B 43/046* (2013.01);
    (Continued)

(58) Field of Classification Search
    CPC ............ F16K 99/0015; F16K 99/0057; F16K 99/0048; F16K 99/0007; F16K 2099/0074;
    (Continued)

(56) References Cited

U.S. PATENT DOCUMENTS 4,966,646 A  10/1990 Zdeblick
5,171,132 A * 12/1992 Miyazaki ................ F04B 43/14
                                                      417/322
(Continued)

FOREIGN PATENT DOCUMENTS

DE    19719861 A1    11/1998
DE    19719862 A1    11/1998
(Continued)

*Primary Examiner* — Minh Q Le
(74) *Attorney, Agent, or Firm* — Perkins Coie LLP; Michael A. Glenn

(57) ABSTRACT

A method for manufacturing at least one micromechanical device includes:
providing a first and a separate second substrate, each having two surfaces spaced parallel to each other with a predetermined thickness;
patterning a first trench structure into one of the two surfaces of the first substrate, and a second trench structure into one of the two surfaces of the second substrate;
arranging the patterned surfaces of the two substrates with respect to each other such that a substrate stack with an upper and a lower surface is defined and the first and/or second trench structure forms at least one cavity therein;
thinning the substrate stack from its upper and/or lower surface;
exposing the at least one cavity by patterning a recess into the upper and/or lower surface of the substrate stack,
wherein exposing the at least one cavity is performed after arranging the two substrates into the substrate stack.

(Continued)

Further embodiments relate to a valve manufactured by means of the method and to a micromechanical pump.

23 Claims, 7 Drawing Sheets

(52) U.S. Cl.
CPC ...... *F16K 99/0007* (2013.01); *F16K 99/0048* (2013.01); *F16K 2099/0074* (2013.01); *F16K 2099/008* (2013.01); *F16K 2099/0094* (2013.01)

(58) Field of Classification Search
CPC ....... F16K 2099/008; F16K 2099/0094; F04B 43/046
USPC .................................................. 137/843, 833
See application file for complete search history.

(56) References Cited

U.S. PATENT DOCUMENTS

| | | | | |
|---|---|---|---|---|
| 5,316,618 A * | 5/1994 | van Lintel | ........... | H01H 1/0036 438/751 |
| 5,542,821 A * | 8/1996 | Dugan | ..................... | F04B 17/00 417/322 |
| 5,759,015 A * | 6/1998 | Van Lintel | ........... | F04B 43/046 417/322 |
| 6,261,066 B1 | 7/2001 | Linnemann et al. | | |
| 6,395,638 B1 | 5/2002 | Linnemann et al. | | |
| 6,612,535 B1 * | 9/2003 | Tai | ....................... | F16K 99/0015 251/129.01 |
| 8,475,144 B2 * | 7/2013 | Kang | .................... | F04B 43/046 417/413.1 |
| 9,410,641 B2 * | 8/2016 | Herz | ..................... | F04B 43/043 |
| 2004/0037718 A1 * | 2/2004 | Xie | ........................ | F04B 43/046 417/413.2 |
| 2006/0147324 A1 * | 7/2006 | Tanner | .................. | F04B 43/046 417/411 |
| 2009/0130822 A1 | 5/2009 | Collet et al. | | |
| 2011/0034873 A1 * | 2/2011 | Cassemeyer | .......... | F04B 19/006 604/151 |
| 2014/0178227 A1 * | 6/2014 | Richter | ................ | F04B 53/106 417/470 |
| 2016/0133517 A1 | 5/2016 | Delamarche et al. | | |
| 2021/0296567 A1 * | 9/2021 | Mou | .................... | B81C 1/00539 |

FOREIGN PATENT DOCUMENTS

| | | |
|---|---|---|
| DE | 102005052039 A1 | 5/2007 |
| EP | 2542810 B1 | 4/2015 |
| JP | 2014058010 A | 4/2014 |
| WO | 2006056967 A1 | 6/2006 |
| WO | 2009052842 A1 | 4/2009 |
| WO | 2011058140 A2 | 5/2011 |

* cited by examiner

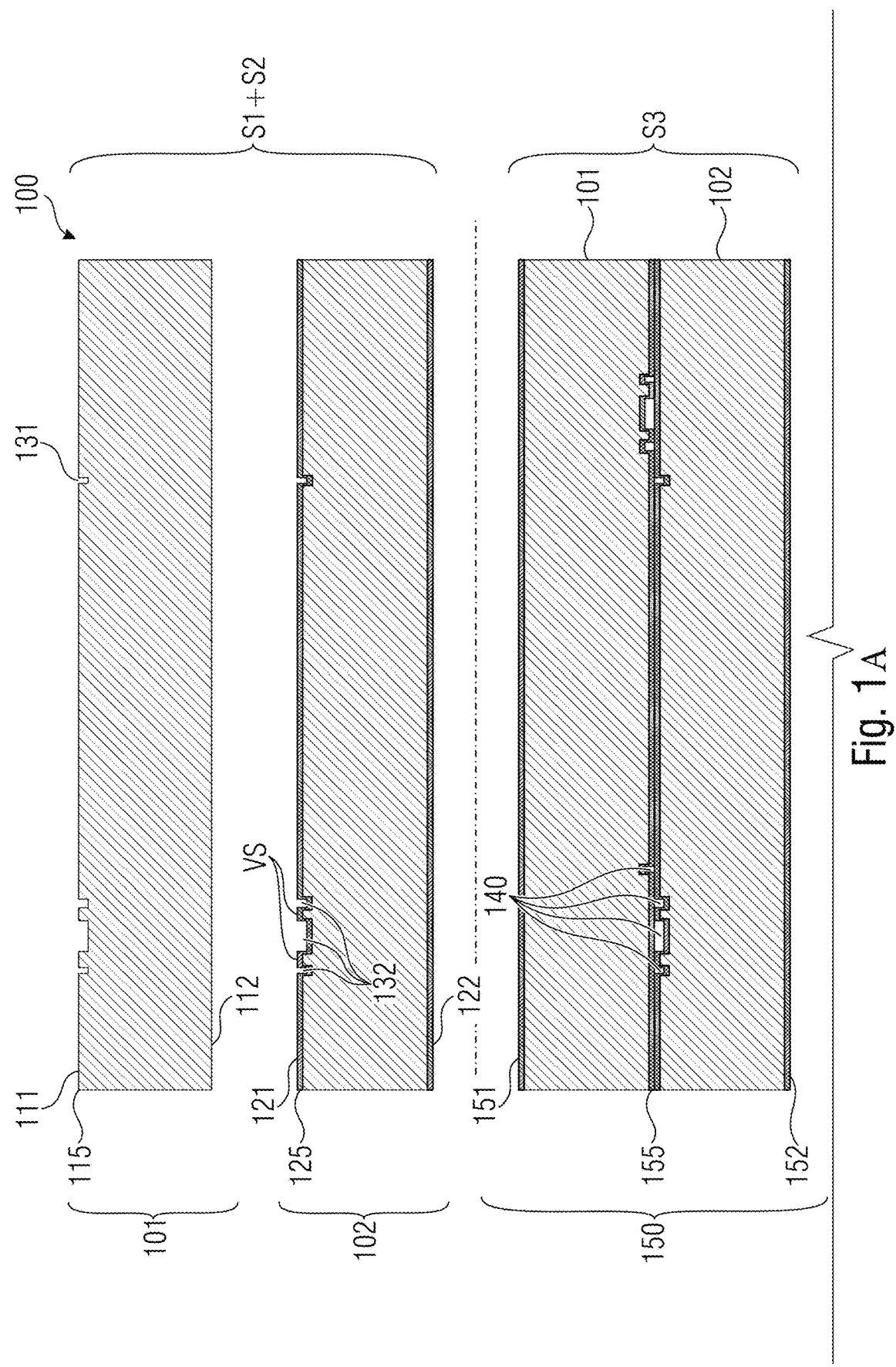

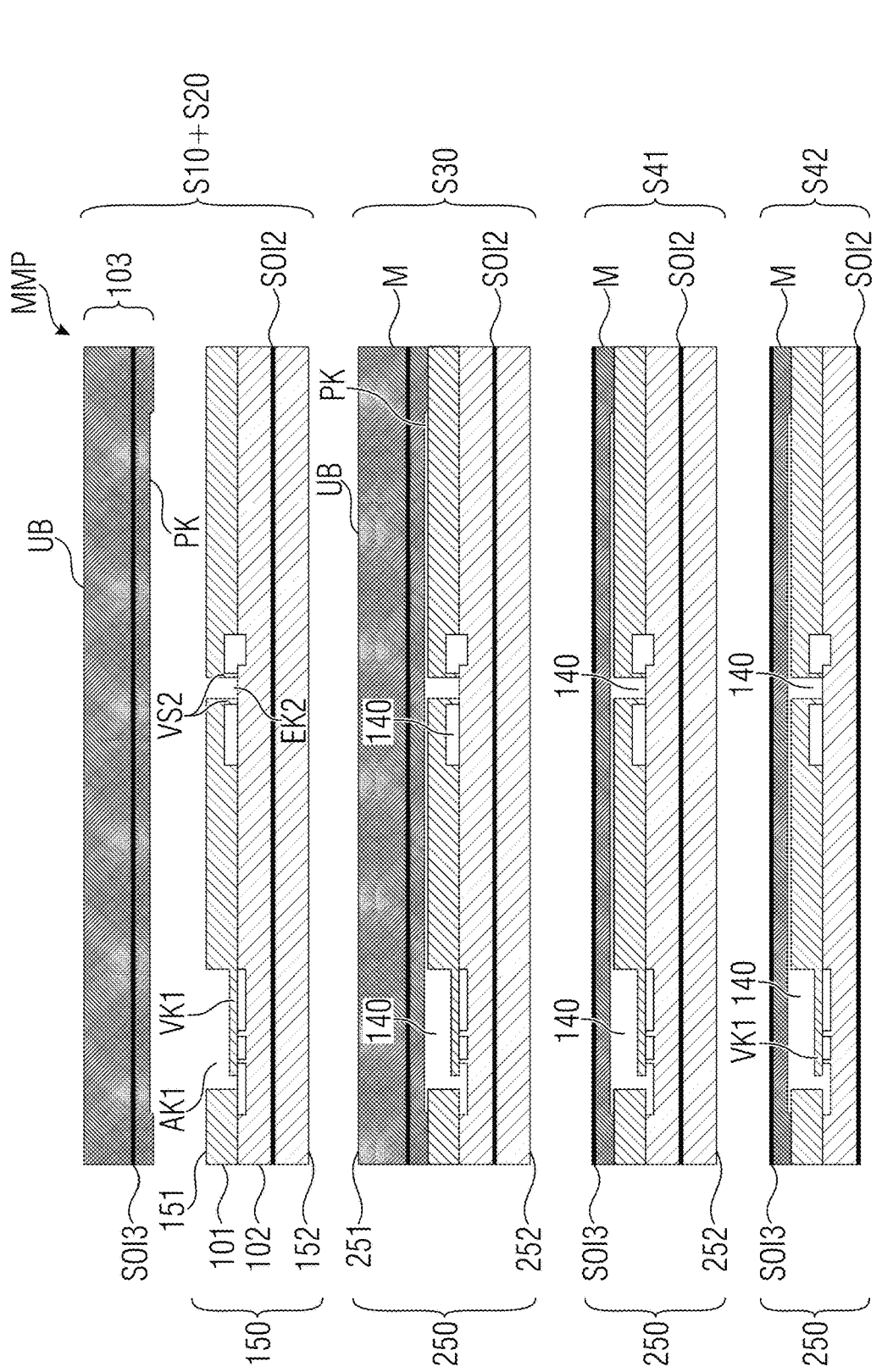

METHOD FOR MANUFACTURING A MICROMECHANICAL DEVICE AND MICROMECHANICAL VALVE

CROSS-REFERENCES TO RELATED APPLICATIONS

This application is a continuation of copending International Application No. PCT/EP2020/065067, filed May 29, 2020, which is incorporated herein by reference in its entirety, and additionally claims priority from German Application No. DE 102019208023.5, filed May 31, 2019, which is incorporated herein by reference in its entirety.

The embodiments of the invention relate to a method for manufacturing a micromechanical device and, in particular, a micromechanical valve, as well as a micromechanical device or a micromechanical valve, respectively, which can be manufactured according to the method.

The technical field of the invention relates to so-called microstructuring, that is, the manufacturing of micromechanical devices with dimensions in the micrometer range. Today, among other things, pumps with very small dimensions are manufactured by means of such a microstructuring process, these pumps being also referred to as micropumps. These micropumps can pump fluids such as air or even liquids.

BACKGROUND OF THE INVENTION

A micropump that has been patented by the Applicant is described in EP 2 542 810 B1. This micropump comprises a membrane, which is why this type of micropump may also be referred to as a micromembrane pump. These micropumps comprise a valve stack or valve wafer in which microstructured valves are provided. These valves are in fluid communication with corresponding fluid inlets and fluid outlets. Accordingly, the valves are inlet valves and outlet valves. For further details in this respect, reference is made to EP 2 543 810 B1, the disclosure content of which is hereby incorporated by reference.

The valves of the micropump comprise valve flaps and valve ridges, with the valve flaps, in their non-deflected rest state, resting on so-called valve ridges. The valve ridges provide a mechanical end stop for the valve flaps. The valve ridges and the valve flaps are usually structured in two substrates or wafers arranged one above the other. In a first substrate, for example, the inlet channel and the valve ridge are patterned, and in a second substrate located above these, for example, the valve flap is patterned or vice versa. In this way, a plurality of inlet valves and/or outlet valves may be patterned in two substrates—depending on their dimensions.

Today, temporary wet chemical KOH etching processes are used for patterning the microvalves. This is a well-controllable method that can achieve appropriate etching results. However, the etching process is anisotropic, so that the wet chemical etching process is directional, wherein undesired underetching leads to a higher waste rate in the manufacturing of microvalves. Further, the fluidically essential dimensions of the valves for the pump and the anisotropy between vertical as well as lateral etch rate for the process may use a large amount of space and thus prevent further size reduction. Additionally, the KOH etching process is not offered by all manufacturing plants as it causes particles through sharp edges as well as cross contamination.

SUMMARY

According to an embodiment, a method for manufacturing at least one micromechanical device may have the steps of: providing a first substrate and a separate second substrate, the first substrate having two surfaces spaced parallel to each other with a predetermined thickness, and the second substrate having two surfaces spaced parallel to each other with a predetermined thickness; patterning a first trench structure into one of the two surfaces of the first substrate, and patterning a second trench structure into one of the two surfaces of the second substrate; arranging the patterned surfaces of the two substrates with respect to each other such that a substrate stack with an upper surface and a lower surface is defined, and such that the first and/or second trench structure forms at least one cavity in the substrate stack; thinning the substrate stack from the upper and/or lower surface of the substrate stack; exposing the at least one cavity by patterning a recess into the upper and/or lower surface of the substrate stack, wherein, in the method, the step of exposing the at least one cavity is performed after arranging the two substrates into the substrate stack.

Another embodiment may have a micromechanical valve manufactured according to an inventive method.

Another embodiment may have a micropump including an inventive micromechanical valve.

When manufacturing microvalves, using temporary wet chemical KOH etching processes, currently both substrates are first processed independently by etching the aforementioned valve ridges and valve flaps into the respective substrates. Subsequently, the two substrates are then connected, for example, by bonding.

However, when handling, and in particular when bonding, branding and polishing a valve stack or valve batch of the two substrates, it is essential to proceed with extreme precision and care. Since the microstructured valves comprise very small thicknesses, the valve flaps are correspondingly sensitive and therefore unstable, so that the valve flaps can break out during handling and processing of the substrates.

Thus, it would be desirable to improve these known methods for manufacturing micromechanical devices, and in particular micromechanical valves, with respect to the above-mentioned disadvantages.

For this purpose, a method with the features of claim 1 and a micromechanical device according to claim 18 are suggested, wherein the micromechanical device may be manufactured by means of the inventive method. Embodiments and further advantageous aspects of the invention are mentioned in the respective dependent patent claims.

A first aspect of the invention relates to a method for manufacturing at least one micromechanical device. A micromechanical device may be, for example, a micromechanical valve, which in turn may comprise one or more valve flaps and one or more valve ridges. The method includes, among other things, providing a first substrate and a separate second substrate, the first substrate comprising two surfaces spaced parallel to each other with a predetermined thickness, and the second substrate comprising two surfaces spaced parallel to each other in a predetermined thickness. The substrates may be individual chip substrates or wafers. The surfaces spaced parallel to each other may also be referred to as a first and a second main side of the respective, generally flat substrate, wherein the first main side of a substrate faces away from the second main side, respectively. A first trench structure is patterned into one of the two surfaces or main sides of the first substrate, so that the first substrate has a correspondingly patterned surface or a correspondingly patterned main side. A second trench structure is patterned into one of the two surfaces or main sides of the second substrate, so that the second substrate has a correspondingly patterned surface or correspondingly patterned main side. Next, the two substrates are bonded, wherein the respective patterned surfaces of the two substrates are facing each other. Thus, a substrate stack is formed having an upper and a lower surface, or a first substrate stack main side and an opposite second substrate stack main side, respectively. In this regard, the first and/or second trench structure forms at least one cavity in the substrate stack. This at least one cavity may then be exposed by patterning a recess into the upper and/or lower surface of the substrate stack. That means, patterning (e.g. etching) may be performed starting from the upper and/or lower surface of the substrate stack towards the cavity until the cavity is reached. Thus, the cavity may be exposed so that the same is accessible from the outside (i.e., from the upper or low surface of the substrate stack, respectively). Moreover, a trench structure may be shaped such that it defines the outer outlines of a valve flap or a valve ridge. This means, by exposing the cavity which is actually formed by the correspondingly shaped first and/or second trench structure, the valve flap corresponding to the respective trench structure or the valve ridge corresponding to the respective trench structure is formed. According to an embodiment, the step of exposing the at least one cavity is performed temporally or in proper order after arranging or bonding the two substrates, respectively. That is, the substrates are first bonded so that the substrate stack is formed, and then the cavities are exposed. The advantage of this is that a substrate stack is generated first, which is correspondingly stable and thus safe to handle. This means that, unlike in known technology, the individual substrates do not have to be processed first (manufacturing of the valve flaps and/or valve ridges) and the finished processed substrates then bonded. Instead, according to the embodiment, bonding is performed first and then processing, i.e. the previous bonding order is reversed. As a result, it may be specifically prevented that the valve flaps are exposed during thinning and are thereby directly exposed to grinding or polishing. The cavity may then be exposed. Furthermore, the substrate stack is much more stable than the individual substrates, which significantly reduces the risk of valve flaps breaking out compared to conventional methods. Optionally, the substrate stack may also be thinned from the top and/or bottom surface. Since not individual substrates but the entire substrate stack is thinned (for example, by grinding, polishing, etc.), the individual substrates of the substrate stack may be made significantly thinner than in conventional methods. This means that, in principle, individual substrates may also be made thinner prior to their processing, saving material and shortening or completely reducing processing steps. As a result, the entire valve stack or valve wafer may be thinner without sacrificing the stability of the valve flaps.

The first trench structure may form the outlines for a first micromechanical structure, for example for a valve flap, which may be generated by means of the embodiment of the method. The second trench structure may form the outlines for a second micromechanical structure, for example for a valve ridge, which may be generated by means of the method. When the two substrates are bonded, i.e. when the substrate stack is generated, the first trench structure and the second trench structure each form cavities within the substrate stack. In this regard, the first trench structure may form a first cavity, and the second trench structure may form a second cavity. However, it is equally possible for the first and the second trench structure to form a cavity together. Thus, exposing the cavity or the cavities, respectively, is equivalent to exposing the respective first and/or second trench structure. This means, by exposing the first and/or second trench structure, a first micromechanical structure (e.g. a valve flap) and a second micromechanical structure (e.g. a valve ridge), respectively, may be generated accordingly.

According to an embodiment, exposing the at least one cavity may be performed using a CMOS-compatible etching process. Embodiments relate to a CMOS-compatible process and a CMOS-compatible valve. The previously used KOH etching is a special process that is not compatible with CMOS manufacturing. Typical semiconductor manufacturing plants (fabs) either do not have this process or only have it in separate areas and also do not allow line crossing due to cross contamination. The reason for cross contamination is mobile charge carriers of potassium (K+), which in CMOS structures lead to leakage currents due to defects in the forbidden zones or oxide-semiconductor boundary layers.

According to a further embodiment, the first substrate and/or the second substrate may be glass or a semiconductor substrate. This may be single semiconductors, such as germanium, etc., or compound semiconductors, such as GaN, GaAS, etc. Silicon lends itself for the present method, since silicon has a high quality and at the same time low material and process costs. Alternatively or additionally, it is possible to deposit a layer, such as polysilicon or germanium, etc., on the first and/or second substrate and to pattern the first and/or second trench structure into this layer.

According to a further embodiment, patterning the first and/or second trench structure and/or the recess in the first and/or second substrate may be performed by means of a wet etching process and/or a dry etching process.

In this context, patterning the recess in the first and/or second substrate may be performed by means of a dry etching process. Dry etching may include, for example, RIE etching (RIE: reactive ion etching) and/or DRIE etching (DRIE: reactive ion deep etching). For example, the method of dry etching has the following advantage: the flanks of KOH structures (wet etching) have 54-degree angles, while the flanks of RIE structures (dry etching) have 90-degree angles, which leads to the need for less chip area for the valves, thus reducing dead volume of the pump. By changing from wet chemical etching to dry chemical (RIE) etching, for example, valves implemented using the above method can both reduce dead volume of a pump and implement smaller structures, so that a micropump with 2×2 mm$^2$ that was previously impossible to manufacture by means of the wet etching method can now be implemented. The change of bonding order described above in conjunction with (D)RIE patterning also has the advantage that grinding and polishing is no longer necessary on patterned substrates, so that the breakout rate of valves is reduced (yield improvement).

Typical valve dimensions are 400 μm×800 μm to 800× 1000 μm.

According to a further embodiment, patterning by means of the wet etching process may be performed prior to patterning by means of the dry etching process. For example, wet pre-etching may be performed first to quickly form a recess, not etching all the way to the cavity. Only then the cavity is being exposed by means of the dry etching process.

According to a further embodiment, the wet etching process may be performed with an aqueous solution, the aqueous solution comprising at least one of the following additives: potassium hydroxide (KOH), tetramethyl ammonium hydroxide (TMAH), lithium hydroxide (LiOH), sodium hydroxide (NaOH), pyrazine, pyrocatechol, ethylenediamine, isopropanol, and tertbutanol.

According to a further embodiment, prior to patterning the first trench structure in the first substrate and/or the second trench structure in the second substrate, a recess may be generated in the respective substrate, and subsequently the first trench structure and/or the second trench structure may be patterned within the respective recess. The recess may be formed by means of chemical etching or other mechanical removal processes. Provided that the recess is formed by means of etching, this may also be referred to as recess etching. The recess is formed in the respective main side of the respective substrate in which the trench structures are later also generated, the trench structures being formed within the recess. This means, the recess has a first depth within the respective substrate, and the respective trench structure is deeper than the recess and thus has a second depth within the respective substrate. The recess formed during recess etching may also be referred to as a step. By introducing a step prior to patterning the valve ridges as well as the valve flaps, bonding of valve seat and valve flap may also be prevented, so that no exposure, such as HF etching, is necessary. By lowering the valves by one step, the "sticking" effect is thus avoided.

Since this recess later represents an initial distance between the valve flap and the support ridge, and thus may lead to leakage rates, the depth of this recess is selected to be as small as possible (for example between 50 and 500 nanometer). This ensures that the valves have a negligible leakage rate.

According to a further embodiment, the first and/or second substrate may be an SOI (silicon-on-insulator) substrate with an insulating layer, wherein thinning the first and/or second substrate formed as SOI substrate is performed up to the insulating layer thereof. This means, the insulating layer serves as a mechanical polishing stop layer and/or as an etch stop for thinning the wafer across the entire area up to a target dimension. As a result, thinning of the respective substrate may be performed very precisely and an extremely thin valve stack may be manufactured.

According to a further embodiment, exposing the at least one cavity by patterning the recess in the area of the SOI wafer may be performed after thinning the SOI wafer and removing the insulating layer thereof on the upper surface and/or lower surface of the substrate stack. This means, first thinning up to the insulating layer acting as a mechanical polishing stop layer is carried out, then the insulating layer is removed in order to expose the underlying substrate portion, and then, in turn, the recess for exposing the cavity is introduced into the exposed substrate portion.

According to a further embodiment, the first trench structure and the second trench structure may be laterally spaced apart from each other within the substrate stack. That is, the first trench structure in the first substrate and the second trench structure in the second substrate comprise a lateral spacing (i.e. along the main extension direction of the substrates) to each other when the first and the second substrate are bonded together in order to form the substrate stack. For example, the first trench structure may at least partially surround the second trench structure. When the cavities formed by the trench structures are then exposed, the result is that the valve flap that may be formed by the first trench structure faces the valve ridge that may be formed by the second trench structure and rests thereon.

According to a further embodiment, when exposing the at least one cavity, a material layer may remain in the first substrate and/or a material layer may remain in the second substrate, wherein the depth of the first trench structure defines the material layer thickness of the material layer remaining the first substrate and/or wherein the depth on the second trench structure defines the material layer thickness of the material layer remaining in the second substrate. As mentioned above, a recess is generated when exposing the cavity. The lateral dimensions (outer outlines) of the recess thereby substantially correspond to the lateral dimensions (outer outlines) of the respective first and/or second trench structure. That is, the recess has approximately the same size (with respect to the lateral dimensions thereof) or is slightly larger than the respective first and/or second trench structure (with respect to the lateral dimensions thereof). For example, a larger etching area may be provided for exposing the flap. On the other hand, for exposure or a penetration the support ridge or valve ridge, the etching should be smaller in area. For exposing the cavity, the recess is introduced up to the cavity. This means that generating the recess ends when the cavity is reached. This leaves the above-mentioned material layer, the thickness of which essentially corresponds to the depth of the respective trench structure. This remaining material layer thickness then defines the thickness of the valve flap or valve ridge generated in the process.

According to a further embodiment, the remaining material layer in the first and/or second substrate may comprise a layer thickness between 5 µm and 35 µm. For example, valve flaps with a thickness between 5 µm and 35 µm may thus be generated.

According to a further embodiment, the remaining material layer in the first and/or second substrate may form the micromechanical device to be manufactured by means of the method. Thus, as mentioned above, the remaining material layer may form the valve ridge and the valve flap, respectively.

According to a further embodiment, the first trench structure and the second trench structure may be aligned with respect to each other within the substrate stack such that after the step of exposing the at least one cavity formed by the first and/or second trench structure, a micromechanical device generated in the first substrate and a micromechanical device generated in the second substrate are arranged opposite each other. For example, in this case, a valve flap and a valve ridge may each be opposed to one another.

According to a further embodiment, an etch stop layer may be disposed between the first and second substrate. Due to the etch stop layer, exposing the cavity may be performed in a highly defined manner, i.e. the etching process may be interrupted or terminated exactly when the etch stop layer reaches the cavity.

A further aspect relates to a micromechanical device and, in particular, to a micromechanical valve manufactured according to an inventive method described herein.

According to an embodiment, in the microvalve, either the first trench structure may be formed in the shape of at least two concentric closed curves and/or polygons in the first substrate, and the second trench structure may be formed in the shape of at least one curve and/or one polygonal chain in the second substrate. Alternatively, the second trench structure may be formed in the shape of at least two concentric closed curves and/or polygons in the second substrate, and the first trench structure may be formed in the shape of at least one curve and/or one polygonal chain in the first substrate. The two concentric closed curves and/or polygons may form a round or polygonal valve ridge, respectively. The at least one non-closed or open curve, respectively, and/or the polygonal chain may form a round or polygonal valve flap.

According to a further embodiment, the respective patterned surfaces of the first and second substrate within the substrate stack may define at least one common connecting surface and at least one cavity in the substrate stack, so that an inner outline of that (respective) trench structure which is formed in the shape of the at least one curve and/or polygonal chain partially surrounds an outer outline of that (respective) trench structure which is formed in the shape of the at least two concentric closed curves and/or polygons, without intersecting the same. That is, the at least one curve and/or polygonal chain at least partially surrounds (in a lateral direction) the at least two concentric closed curves and/or polygons.

Another aspect relates to a micropump comprising at least one micromechanical valve described herein.

According to an embodiment, in the micropump, a membrane may be arranged on the upper and/or lower surface of the substrate stack containing the micromechanical valve such that the membrane completely covers the trench structures and/or recesses in the substrate stack patterned in the respective surface of the substrate. Thus, a micromembrane pump may be manufactured including a valve stack manufactured according to the inventive method.

According to a further embodiment, the trench structures and/or recesses of the substrate stack covered by the membrane may comprise walls that are substantially perpendicular to the surface of the substrate stack. The more vertical the walls are, the more a dead volume of the micropump may be reduced thereby.

BRIEF DESCRIPTION OF THE DRAWINGS

Embodiments of the present invention will be detailed subsequently referring to the appended drawings, in which:

FIGS. 1a-b shows a lateral sectional view perpendicular to the plane of a substrate or substrate stack with two valves according to an embodiment.

FIGS. 4a-b shows a lateral sectional view perpendicular to the plane of a substrate or substrate stack of a micromechanical pump according to an embodiment.

DETAILED DESCRIPTION OF THE INVENTION

In the following, embodiments are described in more detail with reference to the figures, wherein elements with the same or similar function are provided with the same reference numbers. In addition, method steps relating to a particular feature of a device are interchangeable with that same feature of the device, which also applies the other way round.

Furthermore, a micromechanical valve or a micromechanical pump implementable therewith is described herein as a non-limiting example of a micromechanical device. A micromechanical device may comprise micromechanical structures, wherein valve flaps and valve ridges are described herein as non-limiting examples of micromechanical structures, i.e. a micromechanical valve may comprise micromechanical valve flaps and/or micromechanical valve ridges. However, the method may also be used to manufacture other micromechanical structures and micromechanical devices.

Figure 1B:
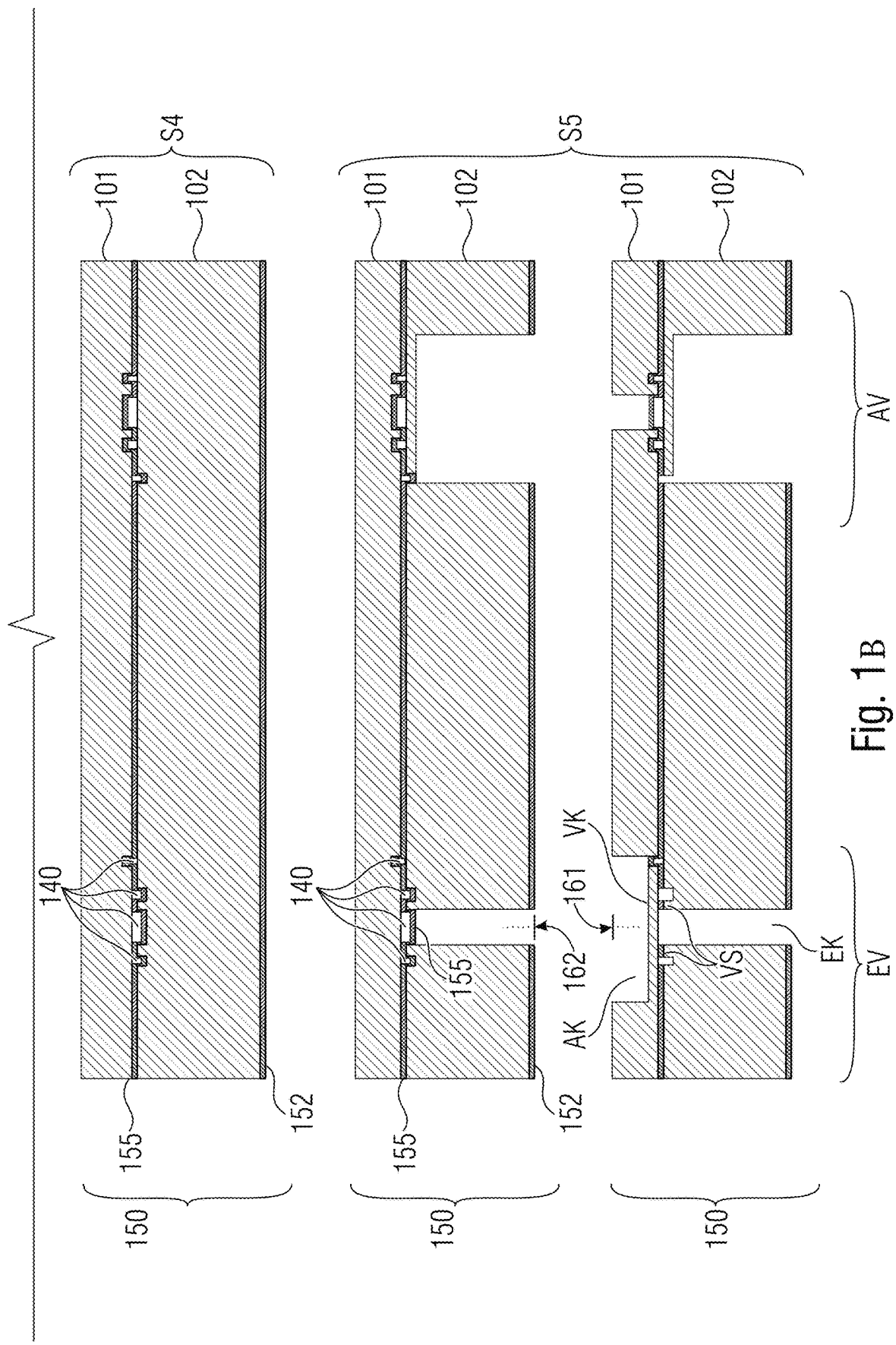

FIG. 1 shows, in a sectional view perpendicular to a plane of a substrate to be processed, different steps S1 to S5 of manufacturing a micromechanical device 100 using the example of individual micromechanical valves EV, AV or a micromechanical pump including at least two such micromechanical valves EV, AV according to an embodiment, in a sectional view perpendicular to a plane of a substrate to be processed. Two substrates 101, 102 are provided S1.

Then, a first trench structure 131 is patterned S2 in a first substrate 101 comprising a first surface 111 and a second surface 112 spaced parallel thereto. The substrate may be a silicon wafer having a predetermined thickness. Silicon wafers to be processed may have a thickness between 100 µm to 500 µm. In the present embodiment according to FIG. 1, the patterning S2 of the first trench structure 131 is performed by means of a dry etching process. The employed dry etching process may be, for example, an RIE (reactive ion etching) or DRIE (reactive ion deep etching) process. Dry etching processes are characterized in particular by good controllability of the etching performance—homogeneity, etching rate, etching profile, selectivity. By means of the dry etching process, nearly vertical walls may be implemented in the first trench structure 131, since the etching is anisotropic. In anisotropic etching processes, the material is affected only perpendicularly to the surface, therefore an extent of etch masking is transferred exactly to the underlying layer.

Corresponding to the first substrate 101, in a second substrate 102 comprising a first surface 121 and a second surface 122 spaced parallel thereto, a second trench structure 132 is patterned S2 into the first surface 121. In the present non-limiting example, the material of the substrate 102 also corresponds to a silicon wafer and the way of the etching process also corresponds to a dry etching process.

Depending on the requirements, the individual substrates 101, 102 may be made of different semiconductor materials. Furthermore, the individual substrates 101, 102 may comprise a coating that may be useful for the selected etching process on their respective first surfaces 111, 121 or their respective second surfaces 112, 122, e.g. an etch stop layer 115, 125 or a photoresist layer and the like.

In the present embodiment, the first trench structure 131 of the first substrate 101 has the same cross-sectional shape as the second trench structure 132 of the second substrate 102—in a sectional plane perpendicular to the surface 111 and 121 of the substrates 101 and 102. The respective trench structures 131 and 132, respectively, may of course be patterned S2 several times on one or the same substrate 101, 102, so that subsequently a plurality of micromechanical valves EV, AV, may be manufactured from a single pair of wafers. Accordingly, FIG. 1 also shows only a part of a wafer that may be used for manufacturing one or more micromechanical valves EV, AV.

In the embodiment according to FIG. 1, two substrates 101 and 102 of the same type, each having a first trench structure 131 and a second trench structure 132, are arranged S3 one above the other to form a substrate stack 150, so that both an inlet valve EV and an outlet valve AV may be implemented. In doing so, an inlet channel EK and a valve ridge VS, for example, are patterned in the second substrate 102 by exposing S5 the cavity 140, and an outlet valve AV and a valve flap VK are patterned in the first substrate 101, which prevents a fluid from flowing between the outlet channel AK and the inlet channel EK while resting on the valve ridge VS in a rest position.

In the following, further discussion is limited only to manufacturing a single valve EV such as the inlet valve EV—which is indicated by a curved bracket in the left half of FIG. 1. The above can be referred in an analogous way to manufacturing an outlet valve AV—which is indicated by a curved bracket in the right half of FIG. 1—and vice versa.

According to an advantageous embodiment, the substrate stack 150 is formed by bonding S3 the first substrate 101 and the second substrate 102 to each other—for example by means of a silicon direct bonding process. In FIG. 1, the substrate 101 is arranged on the substrate 102 such that the original second surface 112 of the first substrate 101 forms an upper surface 151 of the substrate stack 150 or the original second surface 122 of the second substrate 102 forms a lower surface 152 of the substrate stack 150, respectively. The patterned first surface 111 of the first substrate 101 and the patterned first surface 121 of the second substrate 102 are arranged opposite each other, wherein the patterning provided in the respective patterned substrate 101, 102 forms one or more cavities 140 in the substrate stack 150 created by bonding. The cavities 140 may subsequently be exposed.

In the present embodiment, exposing S5 the cavities 140 is performed in proper order only after arranging S3 or bonding the two substrates 101, 102, respectively, to form the substrate stack 150. This provides the advantage that the entire substrate stack 150 is formed to be mechanically more stable and resistant, and thus can be handled more safely and processed more easily. By mutually reinforcing the individual substrates 101, 102 in the entire substrate stack 150, the original substrates 101, 102 may also be selected to be narrower in thickness than such substrates 101, 102 that, without being bonded to each other, would (have to) be processed individually. This may save material and working time as well as reduce the complexity of processing.

Advantageously, in the embodiment of FIG. 1, the upper surface 151 of the substrate stack 150 may be mechanically thinned S4 to a predetermined thickness of the substrate stack 150, for example by sanding or grinding and polishing, which results in large time savings when processing the substrate stack 150. Similarly, the lower surface 152 of the substrate stack 150 may be thinned—which is not shown here. Alternatively or additionally, thinner wafers or substrates 101, 102—i.e. thinner than 450 μm—may be used so that either grinding can be reduced or omitted altogether.

In the substrate stack 150 that has been thinned S4, an inlet channel EK may subsequently be formed by exposing S5 the cavities 140 in the substrate stack 150 by patterning a recess 162 into the lower surface 152 of the substrate stack 150, or an outlet channel AK of the inner valve EK may be formed by patterning a recess 161 into the upper surface 151 of the substrate stack 150. In the present embodiment of FIG. 1, exposing S5 or patterning the recess 162 is also performed by means of a dry etching process—compare above. When looking at the manufacturing of the inlet valve EV, in case of exposing S5 the cavity 140, the recess 162 is patterned vertically up to the cavity 140, starting from the lower surface 152 of the substrate stack 150. This results in the inlet channel EK as well as the valve ridges VS of the inlet valve EV.

For patterning the recess 161 or 162 in order to expose S5 the cavity 140, the effect of the etching process is indicated below in FIGS. 1 to 3 by means of an arrow to illustrate a direction.

According to a further embodiment, an etch stop layer 155 may be arranged between the first and second substrates 101, 102. Here, the etch stop layer 155 may be formed from a coating of the first surface 111 of the first substrate 101 with an etch stop layer 115 and/or from a coating of the second surface 112 of the second substrate 102 with an etch stop layer 125. The etch stop layer allows to perform exposing S5 the cavity 140 in an optimal manner, i.e. the etching process may be interrupted or terminated exactly when the etch stop layer 155 reaches the cavity 140.

Figure 2A:
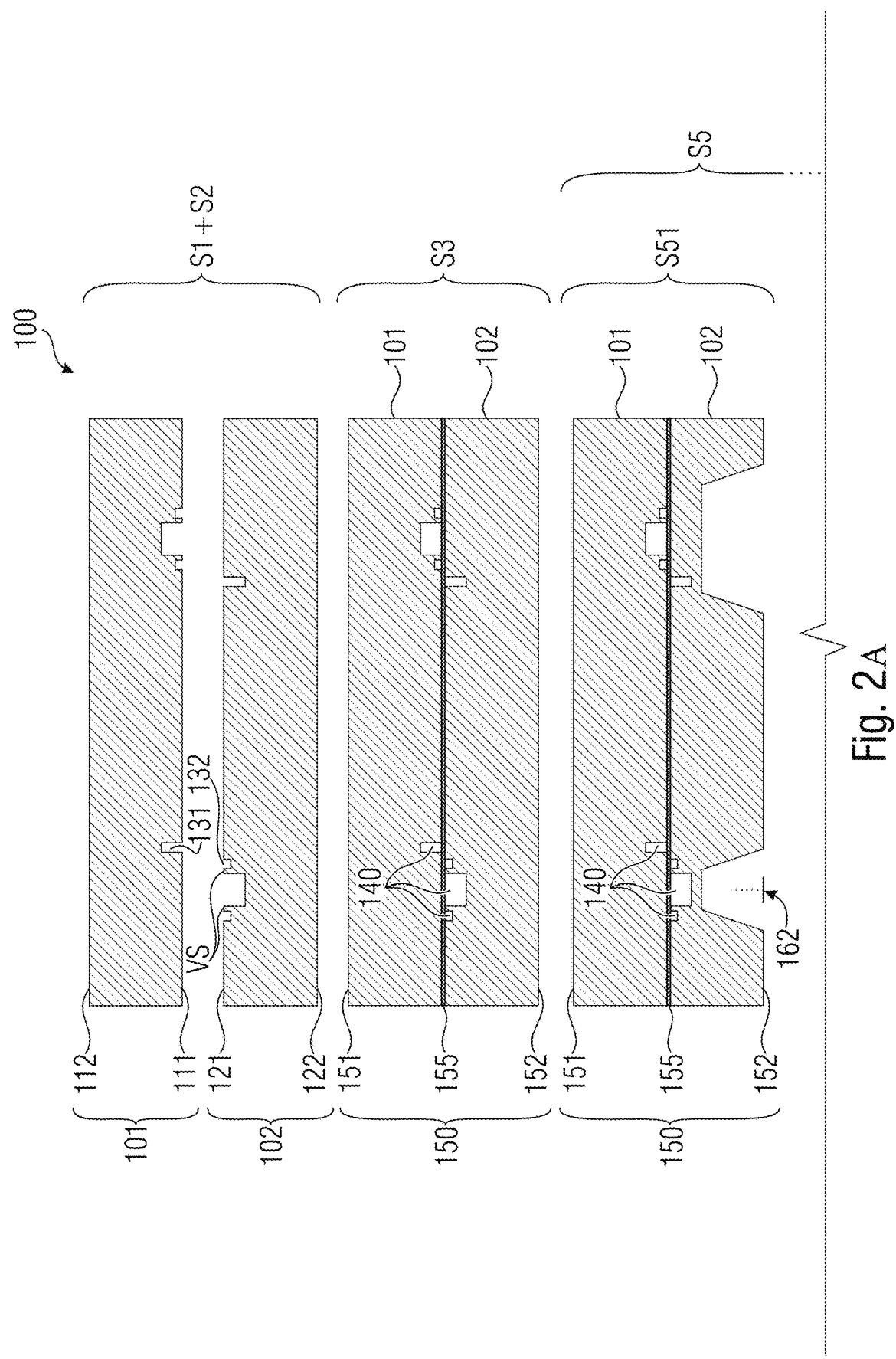
FIGS. 2a-b shows a lateral sectional view perpendicular to the plane of a substrate or substrate stack with two valves according to a further embodiment.
Figure 2B:
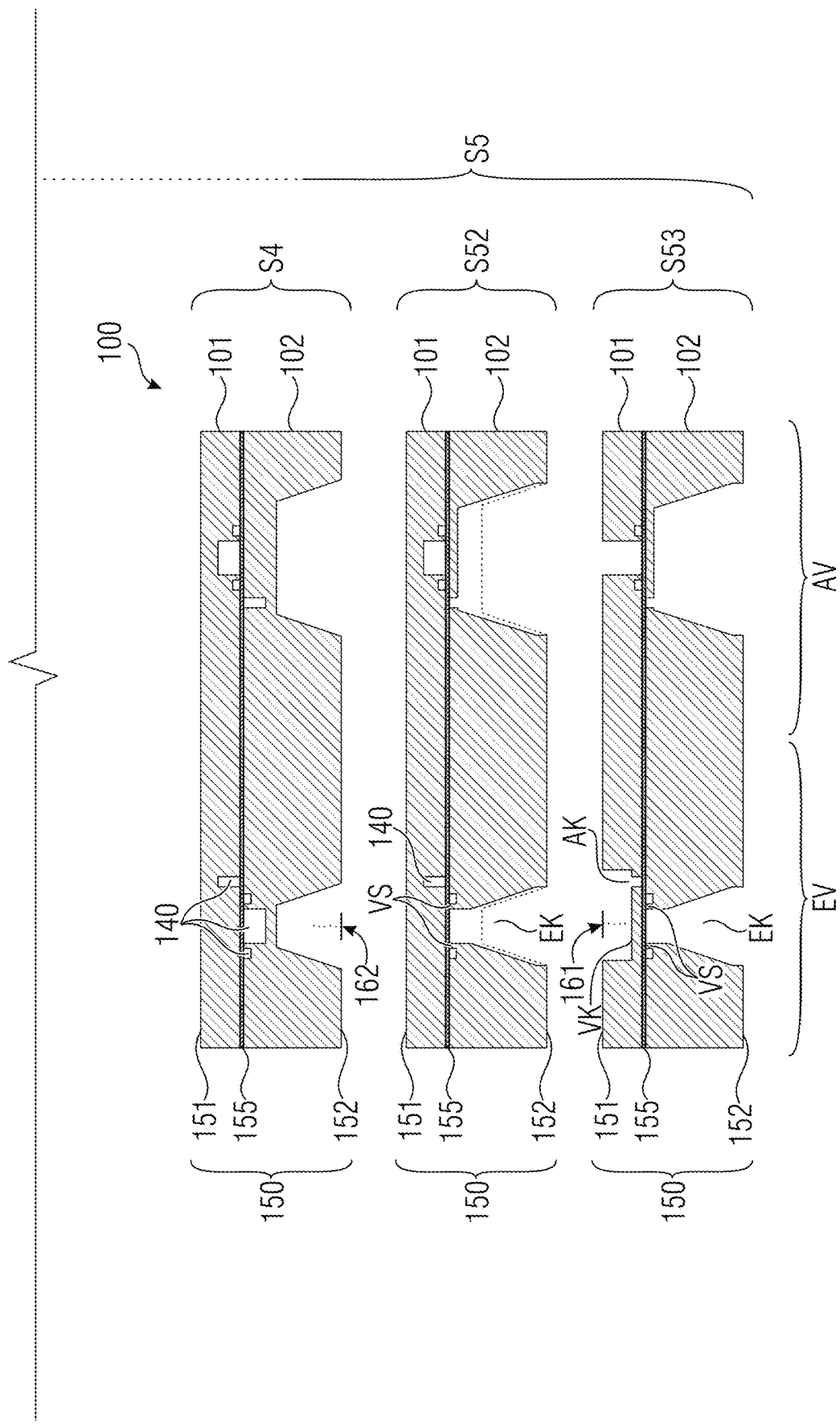

FIG. 2 shows, in a sectional view perpendicular to a plane of a substrate 101, 102 to be processed, different steps S1 to S53 of manufacturing a micromechanical device 100 using the example of individual micromechanical valves EV, AV or a micromechanical pump including at least two such micromechanical valves EV, AV according to a further embodiment.

The embodiment of FIG. 2 differs from the embodiment of FIG. 1, among other things, in that one of the two substrates 101, 102 may be processed by means of different etching processes. Similar to the description in FIG. 1, the description of FIG. 2 also looks, by way of example, only at the manufacturing of a single inlet valve EV. The manufacturing steps, features, functionalities as well as advantages applicable to the inlet valve EV apply equally to the manufacturing of the outlet valve AV using the two substrates 101, 102. Likewise, the advantages of the dry etching process described above apply to the embodiments of FIG. 2—in particular, the etching in the upper surface 151 of the substrate stack 150.

Pre-etching a recess 162 by means of the wet chemical process (in particular, KOH) provides the following advantages over the dry etching process:
1) Wet etching is a parallel process, wherein a large number of wafers or substrates may be etched in parallel, and is therefore more economical;
2) With respect to the homogeneity of the etch depth, wet etching, when performed correctly, is much more homogenous than dry etching. Thus, variations that occur at large etch depths with the aid of the dry etching process may be avoided—at large etch depths of several 100 μm, these variations may be more than 10 μm with dry etching, while the variations may be less than 1 μm with wet etching.

Consequently, by combining chemical wet etching of a part of the recess 162 and exposing the cavities 140 by dry etching, the advantages of both etching methods may be combined in an ideal way.

In the non-limiting embodiment of FIG. 2, the substrates 101 and 102, respectively, that are provided in S1 are created from the same material such as a silicon wafer. A first trench structure 131 patterned into the substrate 101 in S2, and a second trench structure 132 patterned into the substrate 102 are manufactured by means a dry etching process. Here, in S2, the substrate 102 was processed longer in order to pattern a deeper second trench structure 132.

If the two substrates 101, 102 do not already comprise an etch stop layer on their surfaces 111, 112 and 121, 122, respectively, the same may be applied in a process step not shown here, for example, by using dry oxidation.

The two substrates 101, 102 are arranged relative to each other such that their respective patterned surfaces 111 and 121, respectively, are opposite each other and, in S3, are subsequently bonded to form a substrate stack 150. Here, cavities 140 are formed in the substrate stack 150 due to the patterned, S3, surfaces 111 and 121 of the two substrates 101 and 102, respectively. At the same time, the oxide layer, for example an etch stop layer 155, is formed as a common connecting surface by the two substrates 101 and 102.

In contrast to the embodiment of FIG. 1, exposing the cavity 140 starts in S5 before the substrate stack 150 is thinned in S4. In a first sub-step S51, the exposure S5 of the cavity 140 is started by means of a wet chemical etching process. For example, a recess 162 may be pre-etched into the lower surface 152 of the substrate stack 150 by means of a KOH or TMAH process to such an extent that only a predetermined distance, e.g. 10 micrometers to 20 µm, remains to be removed until the cavity 140 is exposed in S4.

By pre-etching the recess 162 by means of the wet chemical process, it is possible to save time because the wet chemical process is a parallel process and thus a larger number of substrates 101, 102 may be etched in parallel, therefore the wafer throughput is much higher. In addition, KOH etching is better regarding the homogeneity of the etch depth.

Furthermore, variations that occur at large etch depths with the aid of the dry etching process may be avoided—at large etch depths of several 100 µm, these variations may be more than 10 µm with dry etching, while they may be less than 1 µm with wet etching. By combining both methods, thus the throughput may be increased, since wet etching (54.7°) is a homogenous parallel process and dry etching allows to form steeper flank (of approx. 90°).

If for wet pre-etching the hole of the etch start is selected smaller, this serves as a mask for the subsequent dry etching, see dotted line in step S5 of FIG. 2. For the flow, this additional restriction does not play a significant role, since the decrease in pressure mainly occurs at the valve, where the cross section is even smaller.

Since in the present embodiment a valve flap VK is implemented by the etching step, and flap deflection depends on the third power of the flap thickness, such a parameter variation of the entire wafer might be too large unless the wafer thickness can be reduced. For example, if the flap thickness were 15 µm and the thickness variation where 10 µm, then the flap thickness would vary between 10 µm and 20 µm. Deflections of two valve flaps VK that vary in their thicknesses would therefore differ by a factor of $2^3=8$ under the same load, for example, a pressure. As a result, any variation regarding thickness may be kept small across the entire wafer, since only a few micrometers are etched.

By not exposing the cavity 140 by means of the wet etching process, CMOS compatibility is maintained. Although TMAH has the disadvantage of lower selectivity compared to KOH, TMAH can also be used when using the wet etching process. Since the (deep) etching process in the embodiment according to FIG. 2 is only used to form a recess 162 and not to implement critical design parameters, such as an inlet channel EK or a valve flap VK, the wet etching process may also be performed by using TMAH. After all, TMAH provides much better homogeneity compared to dry etching. Apart from that, unlike dry etching, TMAH wet etching is a batch process. Thus, micromechanical devices 100 according to the embodiments described herein may also be manufactured by MEMS manufacturing plants that do not use KOH wet etching, but do use TMAH wet etching. CMOS compatibility for TMAH or all bases without alkaline metals is maintained.

Subsequent to creating the recess 162 in the substrate stack 150, the upper surface 151 of the substrate stack 150 is thinned in S4. By means of thinning S4, it is achieved that, in a subsequent patterning step for creating a recess 161 in the upper surface 151 of the substrate stack 150 in order to expose the cavity 140 in S5, only a reduced amount of material has to be removed.

In a further sub-step S52 of exposing S5, the recess 162 is patterned up to the etch stop layer 155 in front of the cavity 140 by means of a dry etching process, thereby forming the inlet channel EK of the inlet valve EV. The dry etching process can ensure that critical components of the micromechanical device 100 may be manufactured with particular accuracy.

In a further sub-step S53 of exposing S5 the cavity 140, starting from the thinned upper surface 152 of the substrate stack 150—perpendicular to the upper surface 152—the recess 161 is formed up to the etch stop layer 155 of the cavity 140 by means of a dry etching process, wherein an outlet channel AK of the inlet valve EV is formed.

When exposing the cavities 140 by a dry etching step in S5, the thickness of the valve flap VK is also defined. However, the flap thickness is a critical design parameter and should not vary too much across the wafer. When dry etching, the variation in etch depth across the wafer typically corresponds to a few percent (for example 4%) of the etch depth. If free etching of the flap were performed only by means of dry etching, the thickness variation of the flap would be approx. 16 µm with an etch depth of around 400 µm.

This is another reason why it is very advantageous to perform the deep etching of the group by a homogenous etching step or a homogenous patterning technology (KOH, TMAH), and to implement only the last layer thickness (e.g. 5 . . . 20 µm) by the dry etching process. This ensures that the thickness variation of the valve flap VK across the wafer or the substrate 102 is only 4% of the depth of this last etching step depth, i.e. at 5 to 20 µm only 0.2 to 0.8 µm.

Thus, the smaller the etch depth may be selected when exposing the cavity, the greater the homogeneity of the flap thicknesses across the wafer.

Normally, in dry etching, the etch rate is smaller in the center of the wafer than at the edge of the wafer. Furthermore, it should be noted that the choice of the etch depth of the patterning of the trench structures 131 and 132, which are initially etched on the substrates 101, 102, also takes into account the later etching variations of the etching steps during free etching of the cavity 140 across the wafer and that the valve flaps VK do not become too thin. Thus, advantageously, the etch depth of the structures 131 and 132 may be at least the flap thickness plus the sum of the depth etch variations across the wafer of all backside etching steps. Only then it is ensured that all cavities 140 (also at the wafer edge) are actually opened during exposure without the valve flaps VK in the center of the wafer becoming too thin.

To simplify such a problem, the trench structure 131 or 132, which subsequently determines the valve throughput, may be etched deeper at the beginning; for example, deeper than the sum of all etch variations. As a result, during exposure in S5, the cavities 140 may be etched free in any case, and it is possible to concentrate entirely on setting the valve thickness during this etching step.

In a step not shown in FIG. 2, the etch stop layer 155 is removed to fully expose the cavity 140 in step S5, whereby the inlet valve EV is fully formed.

According to a further embodiment not shown here, prior to patterning the first trench structure 131 in the first substrate 101 in S2 and/or patterning the second trench structure 132 in the second substrate 102 in S2, a recess may be created in advance in the first surface 111 to be patterned of the first substrate 101 and the first surface 121 of the second substrate 102, respectively. Subsequently, the respective trench structures 131, 132 are then patterned within the respective recess in the associated surface 111 and 121, respectively. The recess may be created by means of etching and/or other mechanical removal processes. If the recess is created by means of etching, it may be referred to as recess etching. Recess etching may provide the substrates 101 and/or 102 as semi-finished products for further processing according to preceding embodiments.

Despite all advantages, this combination also has disadvantages. In wet chemical etching, the etch angles of 54.7° specified by the crystal structure occur, so that the lateral dimensions of the valve sumps become larger, which might restrict the miniaturization of the valve EV, AV or a micromechanical pump MMP (in contrast to dry etching with perpendicular etch flanks) for very small valve chips.

Figure 3:
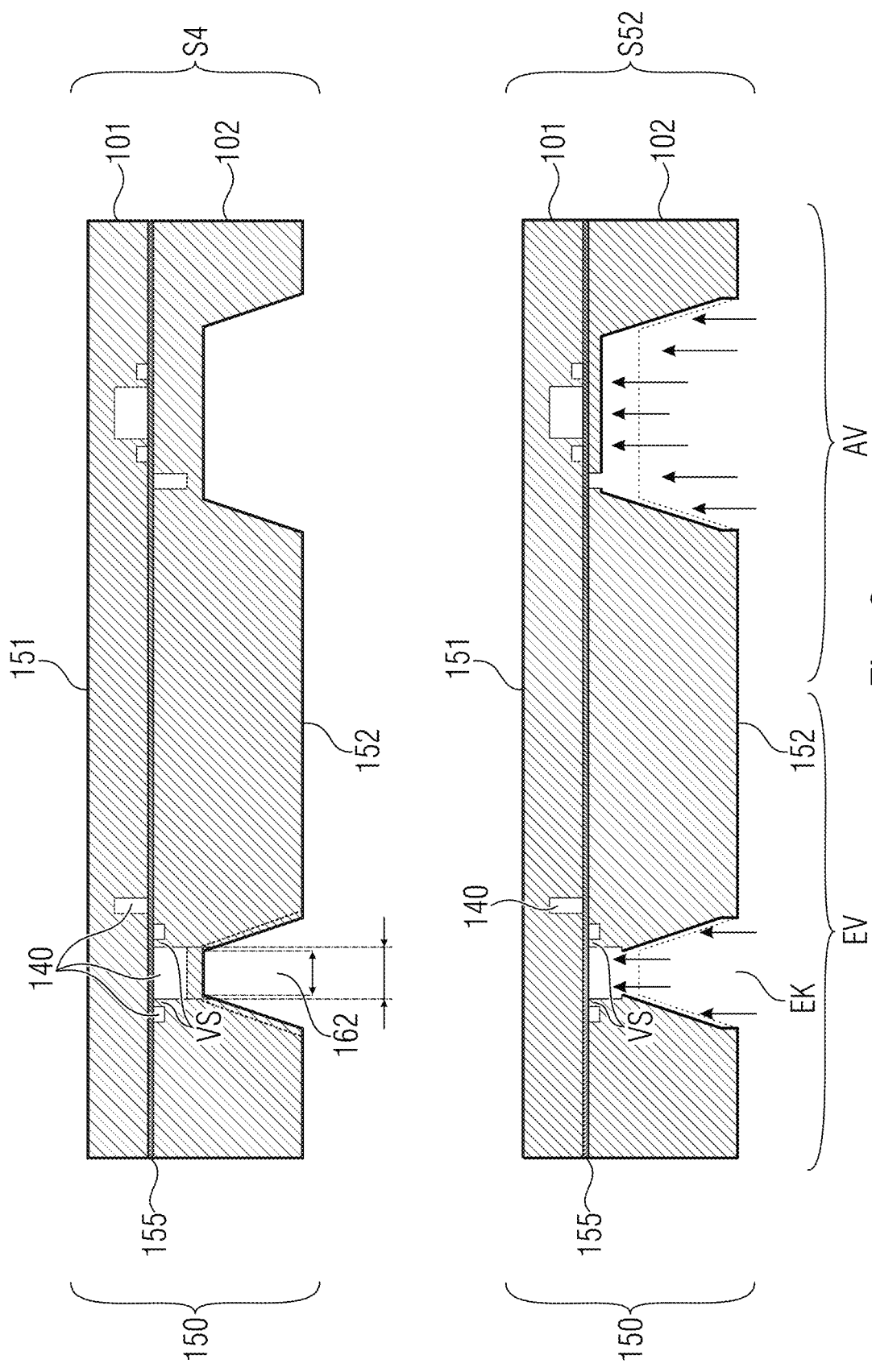
FIG. 3 shows, in a further lateral section view perpendicular to the plane of a substrate or substrate stack, the process of a masking pre-etching according to a still further advantageous embodiment.

It is also possible to form the remaining part of the substrate material of the recess 162 up to the cavity 140 smaller in order to make the exposure in S52 safer by dry etching, and to avoid the lateral etching attack of the valve ridges VS by using the etching pit as a shadow mask: this process is illustrated in FIG. 3 showing, in a further lateral section view perpendicular to the plane of a substrate stack 150, the process of a masking pre-etching in addition to or as a variation similar to the embodiment of FIG. 2. Here, boundaries of an outline of the shadow mask in FIG. 3 are indicated by horizontal arrows directed towards each other in the recess 162. In FIG. 3, vertical arrows indicate the direction of the subsequent dry etching for exposing the cavity 140 in S52 so that an inlet channel EK is formed.

Although the flow area at the etching point is then smaller than the support area of the valve ridges VS of the valve flap VK, this is not important from the point of view of fluid mechanics, since restriction points at the valve are much smaller than at the point where the recess 162 merges into the cavity 140, even when the valve flap VK is open, and otherwise, the pressure drop mainly occurs at the valve flap VK.

In the present embodiment, since a valve flap VK is implemented by the etching step and flap defection depends on the third power of the flap thickness, such parameter variation across the entire wafer and substrate stack 150, respectively, might be too large unless the wafer thickness can be reduced. For example, if the flap thickness where 15 μm and the thickness variation were 10 μm, then the flap thickness would vary between 10 μm and 20 μm. Deflections of two valve flaps VK that vary in their thicknesses would therefore differ by a factor of $2^3=8$ under the same load, for example, a pressure. As a result, any variation regarding thickness may be kept small across the entire wafer, since only a few micrometers are etched.

After wet chemical etching the recess 162, free etching of the cavity 140 may not be performed by means of wet chemical etching, as the liquid entering after exposing the cavity 140 may etch the microstructures. Although this risk may be reduced by first passivating the structures using an oxide layer 155, this would be an additional process step. In addition, the entry of liquid into the cavity has other disadvantages.

After wet chemical etching the recess 162, free etching and exposure S52 of the cavity 140, respectively, may be performed by means of an STS dry etching process of only a few micrometers. This small etch depth during exposure S51 also means that (despite relatively large etch variations during dry etching across the wafer) only a small amount of overetching may be used in order to expose all cavities 140 in the substrate stack 150. Here, a small amount of over-etching reduces the risk of damage to the exposed structures. Since STS dry etching is a vertically directed etching process, the structures are not significantly damaged when the cavities 140 are exposed in S52, as they are not in the etching direction.

Figure 4B:
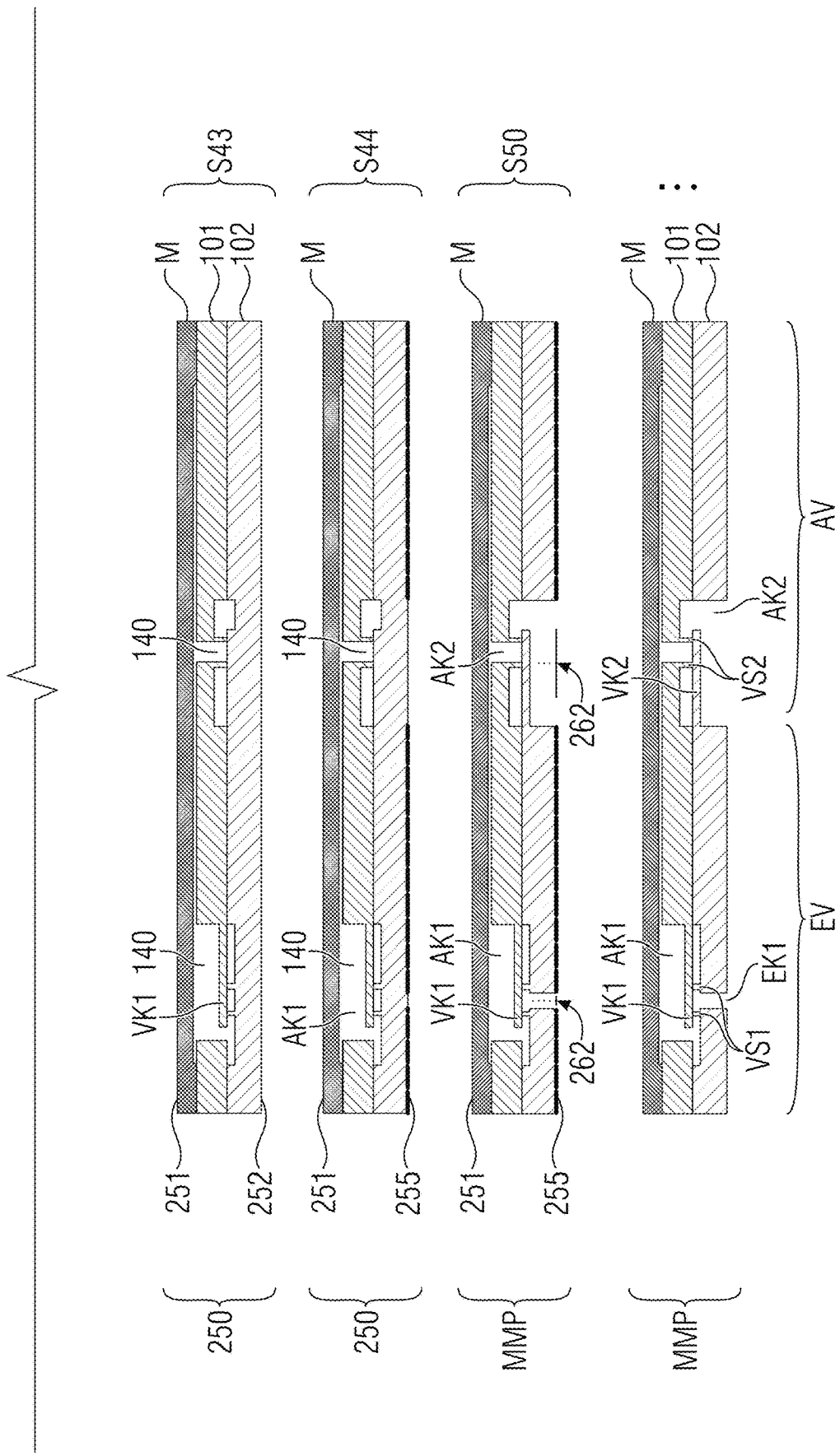

FIG. 4 shows, by way of an embodiment, how a micromechanical device 100 may be implemented in form of a micromechanical pump MMP.

A simple embodiment of a micromechanical pump MMP may comprise at least two valves, for example in inlet valve EV as well as an outlet valve AV, and a pump chamber PK formed by a membrane M spanning the valves EV, AV. In the following, the manufacturing process of a micromechanical pump MMP is exemplified by means of a plurality of steps S10 to S50, the order of the steps being merely an example of an embodiment, i.e. the order of certain steps S10 to S50 may also vary in order to achieve the same result.

S10: For manufacturing the micromechanical pump MMP, an already preprocessed substrate stack 150 is provided, which has been manufactured, for example, by means of a process according to one of the embodiments of FIG. 1 or FIG. 2. In contrast to the previously described embodiments, the substrate stack 150 may be formed from two different substrates 101 and 102, respectively. It is also possible that the substrates 101, 102 are of the same type and, for example, comprise the same material. For example, the substrate 101 may be a silicon wafer bonded to a second substrate 102, which is an SOI wafer, to form a substrate stack 150. The SOI wafer of the second substrate 102 of the substrate stack 150 includes in its interior a silicon oxide layer SOI2, for example, of silicon dioxide, parallel to the lower surface 152 of the substrate stack 150.

S20: In the substrate stack 150 or the substrate 101 thereof, a first outlet channel AK1 has already been patterned with an associated valve flap VK1 and a second inlet channel EK2 with associated valve ridges VS2 by means of dry etching. In the second substrate 102 of the substrate stack 150, trench structures have been provided, which are to form the valve ridges VS1 of the inlet valve EV and the valve flap VK2 of the outlet valve AV, respectively, in a later processing step.

The pump chamber PK of the micromechanical pump MMP is formed in a third substrate 103 which may be an SOI wafer into which the pump chamber PK has already been pre-etched in a second surface of the substrate 103. Parallel to the second surface of the third substrate 103 including the pump chamber PK, a first unprocessed surface UB of the third substrate 103 is spaced apart from the second surface PK by a predetermined distance. The SOI wafer of the third substrate 103 includes in its interior a silicon oxide layer SOI3, for example, of silicon dioxide, parallel to its unprocessed surface UA.

The silicon oxide layer 103 is optional, i.e. the substrate 103 may also be a substrate that does not have a silicon oxide layer. The pump chamber PK formed in the substrate 103 is also optional. It may also be conceivable that the substrate 103 rests flat on the preprocessed substrate 101. The substrate 103 may later form a pump membrane for the micromechanical pump MMP. For this purpose, the substrate 103 or the membrane formed therefrom may be removed from the substrate 101, for example, by means of a piezo actuator. By removing the membrane 103 from the substrate 101, a cavity is formed between the membrane 103 and the substrate 101. In this example, this cavity may then form a pump chamber.

S30: For further processing, the substrate stack 150 is bonded via its upper surface 151 to the second surface on the substrate 103 containing the pump chamber PK to form a new substrate stack 250, for example by means of fusion bonding. The resulting substrate stack 250 now comprises an upper surface 251 corresponding to the unprocessed surface UB of the third substrate 103 and a lower surface 252 corresponding to the lower surface 152 of the substrate stack 150. By connecting the third substrate 103 to the substrate stack 150, a stable and easy-to-handle construction is created that can be further processed in a particularly safe and easy manner. By bonding the third substrate 103 to the substrate stack 150, a cavity 140 is formed that includes parts of the individual valves EV and AV, respectively—in this case, the outlet channel AK1 of the inlet valve EV and the inlet channel EK2 of the outlet valve AV—as well as the pump chamber PK.

The two silicon oxide layers SOI2, SOI3 are used for thinning the entire surface of the substrate stack 250 to a target dimension of the micromechanical pump MMP to be formed therefrom.

S41: For example, the substrate stack 250 is first thinned from its upper surface 251 to the silicon oxide layer SOI3 of the third substrate 103.

S42: Subsequently, the substrate stack 250 is thinned from its lower surface 252 to the silicon oxide layer SOI2. Alternatively, the substrate stack 250 may be thinned in reverse order. The method of thinning down to the single silicon oxide layers SOI2 and SOI3, respectively, may be performed by means of mechanical and/or chemical processes—for example, by means of grinding and spin-etching, including a stop on the silicon oxide layer SOI2 and SOI3, respectively.

S43: Subsequently, the silicon oxide layer SOI2 or SOI3, respectively, is removed.

S44: In order for the micromechanical pump MMP to have the minimum possible dead volume when pumping with the aid of the membrane M, exposure of the cavity 140 from the thinned lower layer 252 of the substrate stack 250 in S50 may be performed by means of a dry etching process. Using the dry etching process, walls of the inlet channel EK1 of the inlet valve EV or walls of the outlet channel AK2 of the outlet valve AV may be formed substantially perpendicular to the lower surface 252 of the substrate stack 250. For this purpose, in an intermediate step, a lithography may be performed on a resist mask 255, thus providing the outlines of the recess 262 to be formed.

S50: Using a dry etching process such as, for example, RIE etching or DRIE etching, exposure of the cavity 140 may then be performed, wherein the inlet channel EK1 of the inlet valve EV or the outlet channel AK2 of the outlet valve AV are patterned in the substrate stack 250. With exposure of the cavity 140, the micromechanical pump MMP is already formed. Finally, in a further step, the resist masking applied to the lower surface 252 of the substrate stack 250 may be removed.

A method for manufacturing a micromechanical pump MMP used according to the embodiments described above is easy to implement and ensures a higher reliability of the micromechanical pump MMP or a lower waste rate during its manufacturing.

Although some aspects have been described in connection with a device, it is understood that these aspects also represent a description of the corresponding process, so that a block or component of a device is also to be understood as a corresponding process step or as a feature of a process step. Similarly, aspects described in connection with or as a process step also constitute a description of a corresponding block or detail or feature of corresponding devices.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for manufacturing at least one micromechanical device, comprising:
    providing a first substrate and a separate second substrate, the first substrate comprising two surfaces spaced parallel to each other with a predetermined thickness, and the second substrate comprising two surfaces spaced parallel to each other with a predetermined thickness;
    patterning a first trench structure into one of the two surfaces of the first substrate, and patterning a second trench structure into one of the two surfaces of the second substrate;
    arranging the patterned surfaces of the two substrates with respect to each other such that a substrate stack with an upper surface and a lower surface is defined, and such that the first and/or second trench structure forms at least one cavity in the substrate stack;
    thinning the substrate stack from the upper and/or lower surface of the substrate stack;
    exposing the at least one cavity by patterning a recess into the upper and/or lower surface of the substrate stack,
    wherein, in the method, exposing the at least one cavity is performed after arranging the two substrates into the substrate stack.

2. The method according to claim 1, wherein exposing the at least one cavity is performed using a CMOS-compatible etching process.

3. The method according to claim 1, wherein the first substrate and/or the second substrate is a semiconductor substrate.

4. The method according to claim 1, wherein patterning the first and/or second trench structure and/or the recess in the first and/or second substrate is performed by means of a wet etching process and/or a dry etching process.

5. The method according to claim 4, wherein patterning by means of the wet etching process is performed prior to patterning by means of the dry etching process.

6. The method according to claim 4, wherein the wet etching process is performed with an aqueous solution, the aqueous solution comprising at least one of the following additives: potassium hydroxide, tetramethyl ammonium hydroxide, lithium hydroxide, sodium hydroxide, pyrazine, pyrocatechol, ethylenediamine, isopropanol, and tertbutanol.

7. The method according to claim 4, wherein the dry etching process comprises RIE etching and/or DRIE etching.

8. The method according to claim 1, wherein, prior to patterning the first trench structure in the first substrate and/or the second trench structure in the second substrate, a recess is generated in the respective substrate, and wherein the first trench structure and/or the second trench structure is subsequently patterned within the respective recess.

9. The method according to claim 1, wherein the first substrate and/or the second substrate is a SOI substrate with an insulating layer, and wherein thinning the first and/or second substrate formed as SOI substrate is performed up to the insulating layer thereof.

10. The method according to claim 9, wherein exposing the at least one cavity is performed by patterning the recess in the area of the SOI substrate after thinning the SOI substrate and removing the insulating layer thereof on the upper surface and/or lower surface of the substrate stack.

11. The method according to claim 1, wherein the first trench structure and the second trench structure are laterally spaced apart from each other within the substrate stack.

12. The method according to claim 1, wherein, when exposing the at least one cavity, a material layer remains in the first substrate and/or a material layer remains in the second substrate, wherein the depth of the first trench structure defines the material layer thickness of the material layer remaining in the first substrate and/or wherein the depth of the second trench structure defines the material layer thickness of the material layer remaining in the second substrate.

13. The method according to claim 12, wherein the remaining material layer in the first and/or second substrate comprises a layer thickness between 5 μm and 35 μm.

14. The method according to claim 12, wherein the remaining material layer in the first and/or second substrate forms a micromechanical structure of the micromechanical device to be manufactured by means of the method.

15. The method according to claim 1, wherein the at least one micromechanical device which can be manufactured using the method comprises a valve flap and/or a valve ridge.

16. The method according to claim 1, wherein the first trench structure and the second trench structure are aligned with each other such that, after exposing the at least one cavity formed by the first and/or second trench structure, a first micromechanical structure generated in the first substrate and a second micromechanical structure generated in the second substrate are arranged opposite each other.

17. The method according to claim 1, wherein an etch stop layer is arranged between the first and the second substrate.

18. A micromechanical valve manufactured according to the method of claim 1.

19. The micromechanical valve according to claim 18, wherein
either
the first trench structure is formed in the shape of at least two concentric closed curves and/or polygons in the first substrate, and
the second trench structure is formed in the shape of at least one curve and/or one polygonal chain in the second substrate
or vice versa.

20. The micromechanical valve according to claim 18, wherein the respective patterned surfaces of the first and the second substrate within the substrate stack define at least one common connecting surface and at least one cavity in the substrate stack, so that
an inner outline of that (respective) trench structure which is formed in the shape of the at least one curve and/or polygonal chain partially surrounds an outer outline of that (respective) trench structure surface which is formed in the shape of the at least two concentric closed curves and/or polygons, without intersecting the same.

21. A micropump comprising a micromechanical valve according to claim 18.

22. The micropump according to claim 21, wherein
a membrane on the upper and/or lower surface of the substrate stack comprising the micromechanical valve is arranged such that the membrane completely covers the trench structures and/or recesses in the substrate stack patterned in the respective surface of the substrate.

23. The micropump according to claim 22, wherein the trench structures and/or recesses of the substrate stack covered by the membrane comprise walls that are substantially perpendicular to the surface of the substrate stack.

* * * * *